(12) United States Patent
Stopka

(10) Patent No.: US 7,216,885 B1
(45) Date of Patent: May 15, 2007

(54) TRAILER MOUNTED AND ADJUSTABLE MIRROR ASSEMBLY

(76) Inventor: Brian Stopka, 1008 Krastanna Dr., Panama City, FL (US) 32405

( * ) Notice: Subject to any disclaimer, the term of this patent is extended or adjusted under 35 U.S.C. 154(b) by 189 days.

(21) Appl. No.: 11/017,600

(22) Filed: Dec. 21, 2004

(51) Int. Cl.
  *B60D 1/36* (2006.01)
  *G02B 5/08* (2006.01)
  *A47G 1/16* (2006.01)
  *A47G 1/24* (2006.01)

(52) U.S. Cl. ................ 280/477; 359/841; 359/872; 359/881; 248/477; 248/479; 248/480; 248/481; 248/484; 248/485

(58) Field of Classification Search ........... 280/477; 359/872, 881; 248/475.1, 480
See application file for complete search history.

(56) References Cited

U.S. PATENT DOCUMENTS

| | | | | |
|---|---|---|---|---|
| 5,096,283 A | * | 3/1992 | Croteau | 359/865 |
| 5,572,354 A | * | 11/1996 | Desmond et al. | 359/265 |
| 5,576,900 A | * | 11/1996 | Baumler et al. | 359/872 |
| 6,239,926 B1 | * | 5/2001 | De Shazer | 359/841 |
| 6,357,126 B1 | * | 3/2002 | Gillen, Jr. | 33/264 |
| 6,499,851 B1 | * | 12/2002 | Kelly et al. | 359/850 |
| 6,923,463 B1 | * | 8/2005 | Ford et al. | 280/477 |
| 6,955,437 B1 | * | 10/2005 | Roberts | 359/841 |

* cited by examiner

*Primary Examiner*—Lesley D. Morris
*Assistant Examiner*—Marc A. Scharich
(74) *Attorney, Agent, or Firm*—William B. Noll

(57) ABSTRACT

A trailer mounted and adjustable mirror assembly for attachment to a trailer or hitch being towed by a towing vehicle. The assembly, when secured, helps facilitate securement of the trailer to the towing vehicle while the driver/operator remains in the towing vehicle. The assembly comprises a removable clamp mounting a pair of adjustable, telescopic tubular members on which is mounted a pivotal mirror mechanism pivotal throughout 360° and countless angles relative to the plane of the pivotal mirror mechanism.

6 Claims, 6 Drawing Sheets

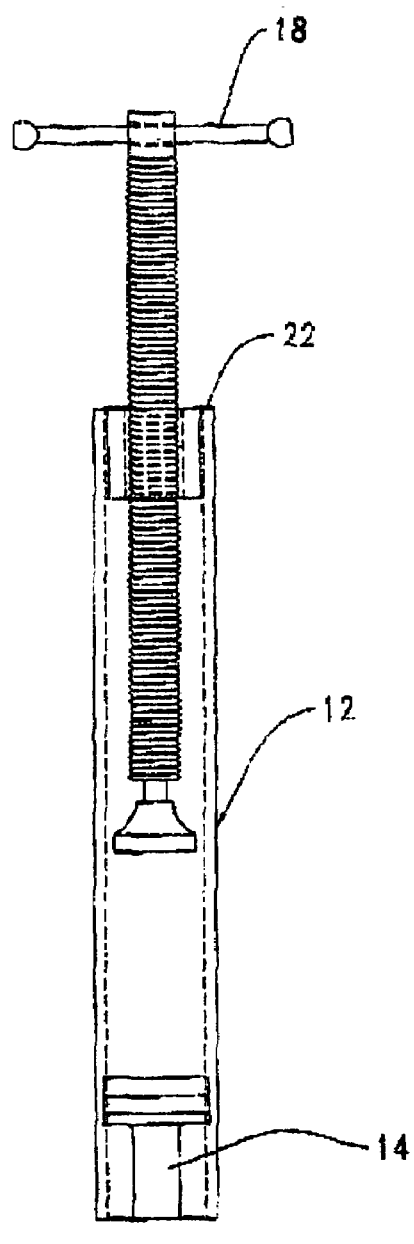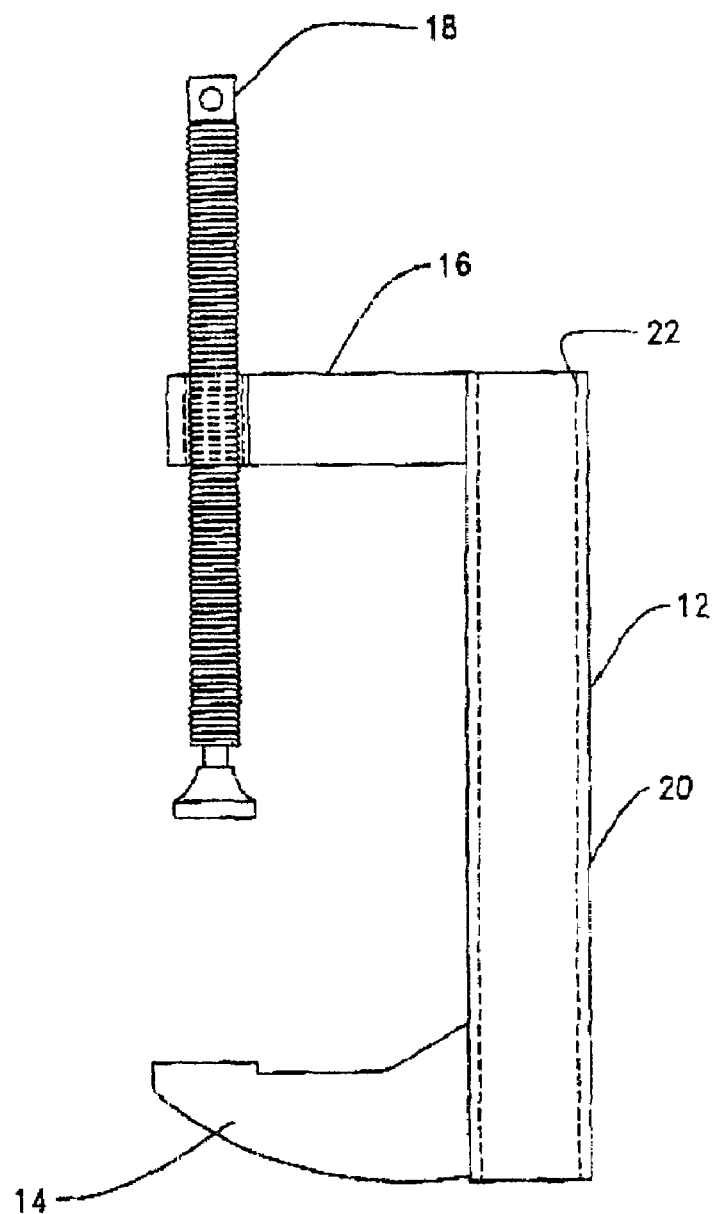
Fig. 4
Fig. 3

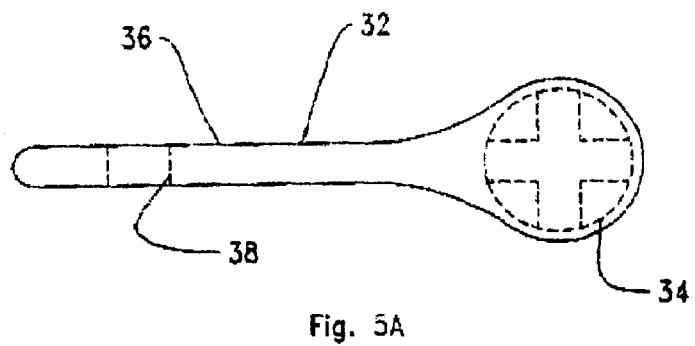
Fig. 5A
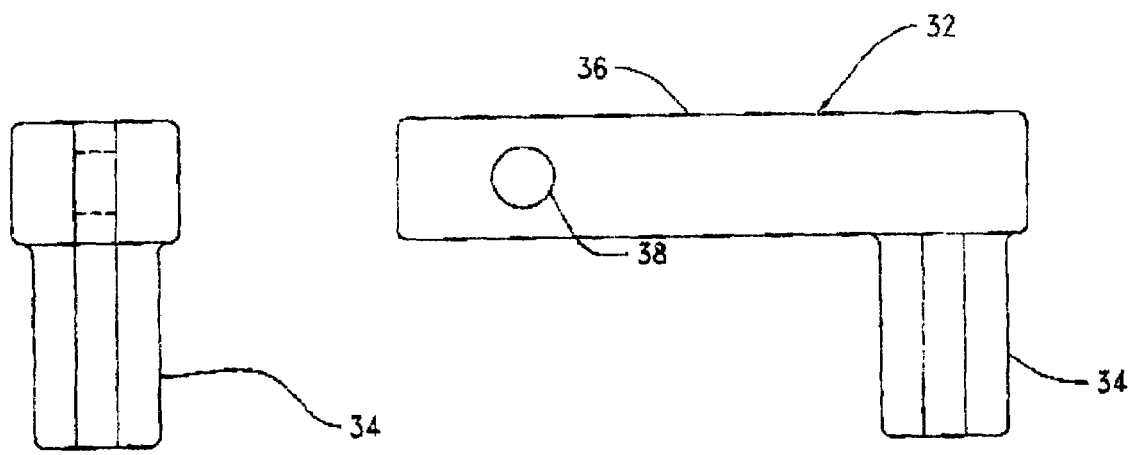
Fig. 5C
Fig. 5B

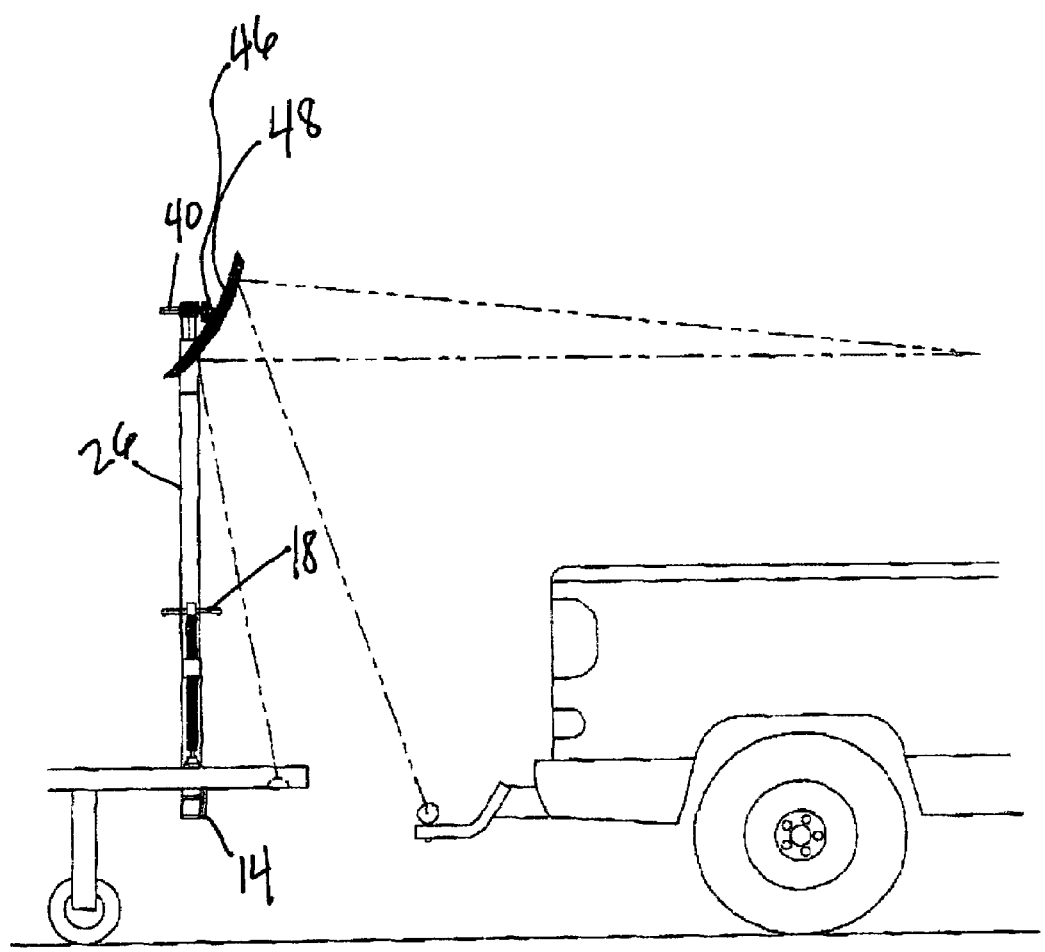

TRAILER MOUNTED AND ADJUSTABLE MIRROR ASSEMBLY

FIELD OF THE INVENTION

This invention is directed to the field of trailer mounted mirrors, more particularly to an adjustable mirror assembly for mounting to a trailer hitch to facilitate lining up the trailer hitch to a towing coupler secured to the towing vehicle.

BACKGROUND OF THE INVENTION

The present invention relates to an improved remote trailer hitch alignment mechanism that features an adjustable mirror pivotal throughout a 360° plane, while being further adjusted within countless angled positions to said plane.

Boat, camper and recreational vehicle trailers and the like are commonly transported by hitching the trailers to towing vehicles by means of a ball and socket type hitch assembly, in which a hitch ball is mounted on the rear frame portion of the towing vehicle, and the trailer is provided with a hitch socket which is adapted to securely receive the hitch ball. A common problem inherent in the ball and socket hitching operation is difficulty in obtaining the necessary alignment of the hitch ball with the hitch socket to effect coupling, since the hitch ball is typically out of view of the driver of the towing vehicle as the vehicle is backed toward the trailer. Consequently, the driver typically experiences substantial difficulty in maneuvering the vehicle to effect proper alignment of the hitch ball with the hitch, since it is virtually impossible to manually maneuver the mounted trailer into a position over the hitch ball.

One technique that is frequently used to effect proper alignment of the hitch ball with the hitch involves positioning an observer at the rear of the towing vehicle to indicate to the driver the proper maneuvering of the towing vehicle needed for the alignment. However, an observer is not always available to assist in the hitching operation. Consequently, various mirror devices have been designed for indicating to the driver of a towing vehicle whether the hitch ball of the vehicle is located in proper alignment with the trailer hitch for successful hitching. However, most of these mirrors are designed to be fixedly mounted on the frame of the trailer and are incapable of convenient removal and adjustment for use with other trailers of various sizes and designs.

There are a number of prior art mechanisms offering some assistance to the towing operator, where certain of such prior art is found in the following U.S. patents:

a.) U.S. Pat. No. 6,499,851, to Kelly et al., teaches a trailer back-up mirror which can be-removably attached to the frame of a boat, camper, recreational vehicle or other trailer for facilitating alignment of the hitch ball on a towing vehicle with the trailer hitch as the vehicle is backed toward the trailer, in order to couple the trailer hitch to the hitch ball. In a preferred embodiment the trailer back-up mirror is characterized by a support shaft which is magnetically and removably attached to the trailer frame. An adjusting shaft is adjustably extendible from the support shaft and a flexible gooseneck shaft extension projects from the extending end of the adjusting shaft. A rectangular mirror mount plate terminates the shaft extension and a flat mirror and convex mirror are mounted on the mirror mount plate. In use, the gooseneck shaft extension is initially adjusted to position the mirror mount plate such that the trailer hitch and hitch ball appear in the convex mirror, and the trailer hitch appears in the flat mirror.

b.) U.S. Pat. No. 6,446,999, to Davis, Jr. discloses a trailer hitch alignment system for providing a driver of a vehicle the ability to visually align the hitch of the vehicle with the tongue of a trailer. The trailer hitch alignment system includes a hitch including a base portion and a joint member extending from the base portion. The hitch assembly further includes a set rod extending upwardly from the base portion. The set rod is positioned proximate the joint member. A mirror assembly is removably couplable to the set rod. The mirror assembly includes a mirror pivotally coupled to a mirror connection frame. The mirror is pivotal about a generally horizontal axis.

c.) U.S. Pat. No. 6,213,608, to Osgood, relates to a viewing mirror device to assist a vehicle driver when connecting the vehicle to a trailer. The mirror device comprises a viewing mirror, an attachment tube or channel for attaching the device to the vehicle hitch, and a mast that connects the viewing mirror to the attachment tube or channel. The position of the viewing mirror can be adjusted so that the vehicle driver can see both the vehicle hitch connection point and the trailer tongue connection point in the mirror.

d.) U.S. Pat. No. 6,076,847, to Thornton, is directed to a trailer hitch mechanism that includes an elongate post removably supported on a towed vehicle and extending upwardly therefrom; a traveler removably fitted to the post and movably positionable along a length thereof throughout a range of fixed, adjusted positions and including opposing arm members surrounding and gripping the post when in a relaxed state to thereby hold the traveler fixed to the post at the adjusted positions, and the arm members being structured to be urged outwardly from the relaxed state to release the grip, thereby permitting sliding movement of the traveler along the post; and a mirror device pivotally fitted to the traveler member and being angularly adjustable for positioning the mirror in a manner which presents a reflected image of a hitch component on the towed vehicle viewable by the operator in the rear view mirror of a towing vehicle, to thereby allow the operator to maneuver the towing vehicle so that a hitch component on the towing vehicle moves toward and into alignment with the hitch component on the towed vehicle, facilitating attachment thereof.

e.) No. 5,309,289, to Johnson, teaches an optical target system for facilitating a vehicle operator's effecting alignment of the respective hitch assembly components of a towing vehicle and a towed vehicle. The system includes first and second targets that are removably positionable in referencing relationship to respective ones of the hitch assembly components and a viewing mirror that is removably positionable on the towed vehicle to provide the vehicle operator positioned in the towing vehicle with a reflected view of the two targets. Each of the two targets includes a longitudinal guidance element that is disposed in alignment with the longitudinal axis of its respective vehicle and a transverse guidance element that is transversely oriented to the respective longitudinal guidance element and located above the hitch assembly component to provide a visual reference to a vertical axis extending through those components.

Though the prior art is replete with a number of patents and commercial devices for use by the operator of a towing vehicle to facilitate the alignment of the towed trailer to the towing vehicle, none offer the ease nor accuracy one needs and desires in making the alignment. The manner by which the present invention achieves the goals hereof will become more apparent in the description which follows, especially when read in conjunction with the accompanying drawings.

SUMMARY OF THE INVENTION

The present invention teaches a remote mirror mechanism for use with and to improve a trailer hitch assembly to facilitate securement of a trailer to a towing vehicle while the driver remains in the vehicle. Typically, a trailer hitch assembly comprises a generally rectangular tubular member fixedly mounted to a vehicle to be used in the towing operation, an elongated, telescopic member for removably securing to the tubular member, where the telescopic member mounts a ball at one end, and a trailer mounting a coupler that includes a cupped end for engagement with the ball. One major difficulty for operators of the towing vehicle is to backup to precisely align the telescopic member and ball with the cupped end, without a second party assistance. This invention, for removably mounting to the trailer in proximity to the cupped end, is directed to a removably mounted, adjustable mirror mechanism that includes a telescopic, vertical arm, a broad mouthed clamp at one end for removably securing the mechanism to the trailer hitch or trailer body, and an adjustable mirror at the opposite end. The mirror is mounted to an extension arm pivotal about the opposite end of the telescopic member, where the mirror is mounted for rotation in a plane of 360° around the extension arm, while the mirror is further movable at countless angles to the plane to ensure a precise positioning of the mirror to viewing by the operator.

Accordingly, a feature of the invention is an improved, adjustable mirror mechanism for a trailer assembly to allow the operator of the towing vehicle to precisely position and align the towing vehicle to the trailer without exiting the vehicle before securing same.

A further feature hereof is the provision of an adjustable mirror that can be adjusted and set at precise angles to aid the operator.

These and other features of the invention will become clearer in the following specification and accompanying drawings.

BRIEF DESCRIPTION OF DRAWINGS

FIG. 3 is a side view of the broad opening trailer hitch mounting mechanism for the assembly according to the invention.

FIG. 4 is a front view of the trailer hitch mounting mechanism of FIG. 3.

FIGS. 5A through 5C are three views showing top, front and side views, respectively, for a pivotal L-shaped mirror mounting arm for use in the assembly of this invention.

FIG. 6 is a partial plan view illustrating the remote mounting of the assembly hereof to the trailer hitch, further showing the line of sight from the vehicle cab to the critical areas of the assembly.

DETAILED DESCRIPTION OF PREFERRED EMBODIMENT

The instant invention relates to a multi-pivotal, removably secured, trailer hitch assembly having an adjustable mirror pivotal about 360° and plural angles to the pivotal plane, whereby a vehicle operator may adjust the mirror then easily backup the vehicle to hitch a trailer without the need of direction by a second party. The adjustability of the trailer hitch assembly will become more apparent from the description which follows, especially when read in conjunction with the accompanying drawings.

Figure 1:
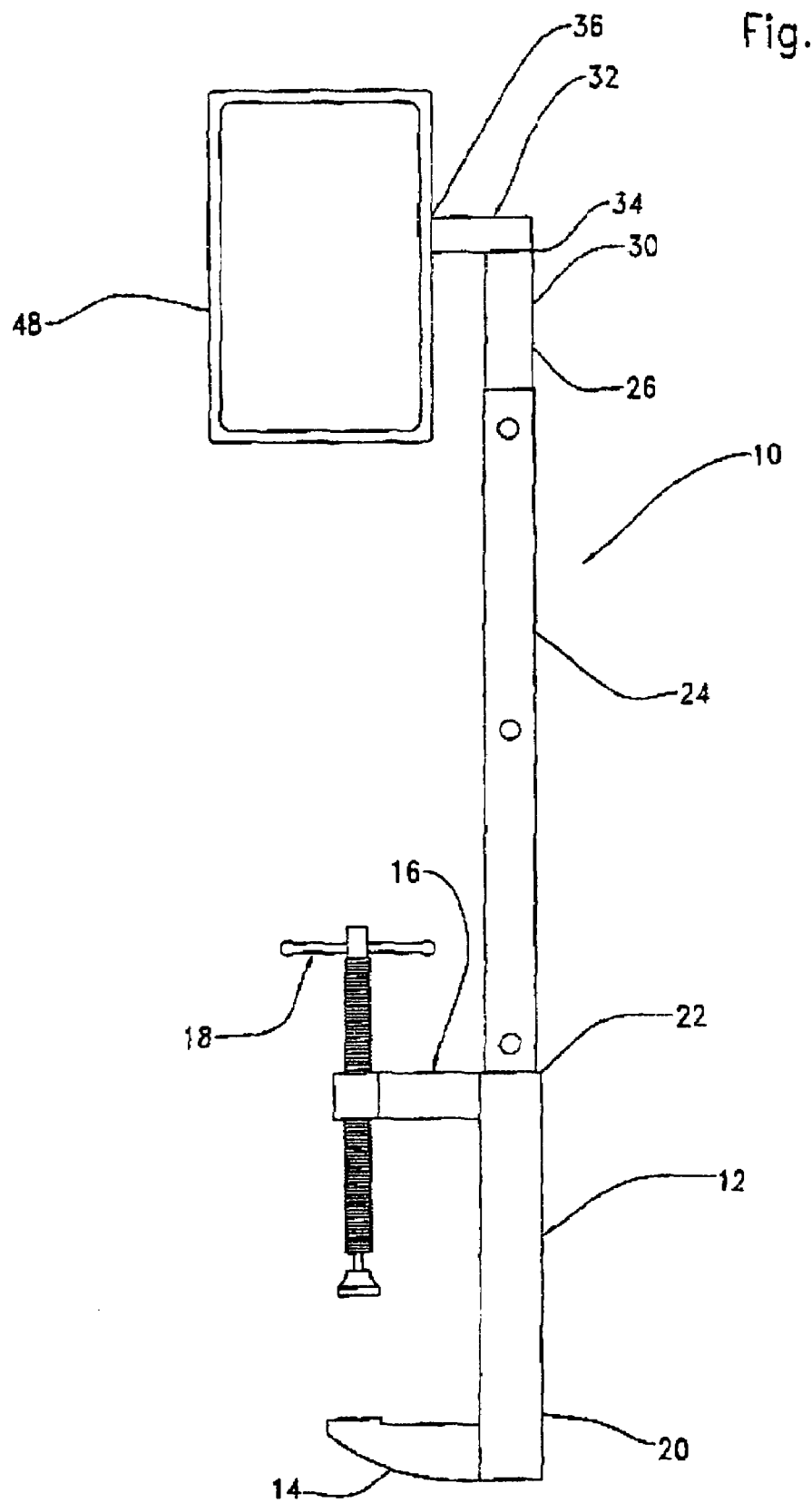
FIG. 1 is a plan view of the removably secured, trailer mounted assembly of this invention, featuring an adjustable mirror mechanism to facilitate a remote alignment of a towing coupler to a trailer hitch.
Figure 2:
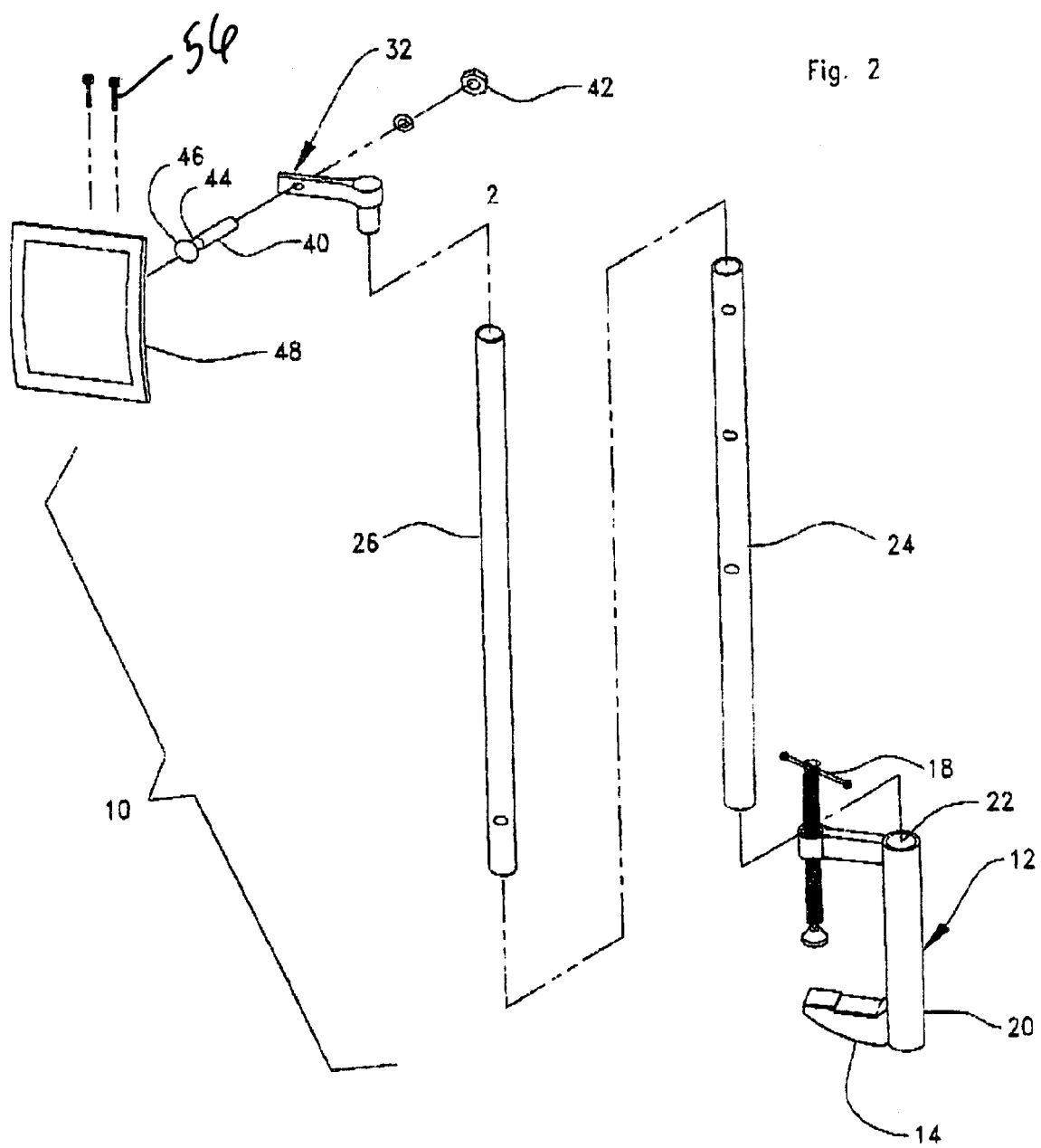
FIG. 2 is an exploded perspective view of the removably secured, trailer mounted assembly of FIG. 1.

Turning now to the several Figures, where FIGS. 1 and 2 illustrate the assembled and exploded views of the adjustable trailer hitch assembly of the invention, respectively, the assembly 10 comprises a broad mouthed C-shaped attachment member 12, where the attachment member has the capability of attachment to a small trailer hitch or a thicker trailer platform. The attachment member includes a lower arm 14, an upper arm 16 having a rotatable member 18 to selectively close and clamp the assembly to a suitable fixed structure, such as the hitch or trailer, FIGS. 3 and 4. Intermediate the respective arms 14, 16, is a tubular connecting member 20 having an internal bore 22 for slidably receiving a first tubular member 24. The first tubular member 24 is likewise sized to slidably receive a second tubular member 26, where the two members 24, 26 may be selectively secured by a gripping means, as known in the art, or, for example, by a V-shaped, depressible, plastic spring clip in one tubular member containing a pair of circular knobs for selective positioning in a pair of a series of opposing holes in the other tubular member, a temporary locking mechanism well known in the art. By this arrangement the vehicle operator can vertically adjust and set the mirror to a desired height.

Mounted for pivotal movement at the free end 30 of the second tubular member 26 is an L-shaped pivotal arm 32 having a first circular leg 34 for rotative movement within the free end 30, and a second extended leg 36, see FIGS. 5A through 5C. The extended leg 36 includes a through hole 38 for securely mounting a balled pin 40, secured by nut 42, where the balled pin includes a free end 44 featuring a ball 46. For pivotal movement about the ball 46 is an adjustable mirror 48. The back of the mirror 48 mounts a pair of opposing brackets 50 where each bracket features a pair of end wings 52 and a central concave section 54, where the respective concave sections are in opposing relationship to one another. In an operable mode, the ball 46 seats between and is gripped by the two concave sections 54. In this operating mode, the mirror 48 may be adjusted about 360°, while at the same time adjustable to any angle to the plane of the pivoting mirror. FIG. 6 illustrates the adjustable mirror assembly attached to a trailer showing the mirror 48 in the line of sight from the operator's cab and the trailer hitch.

Figure 7:
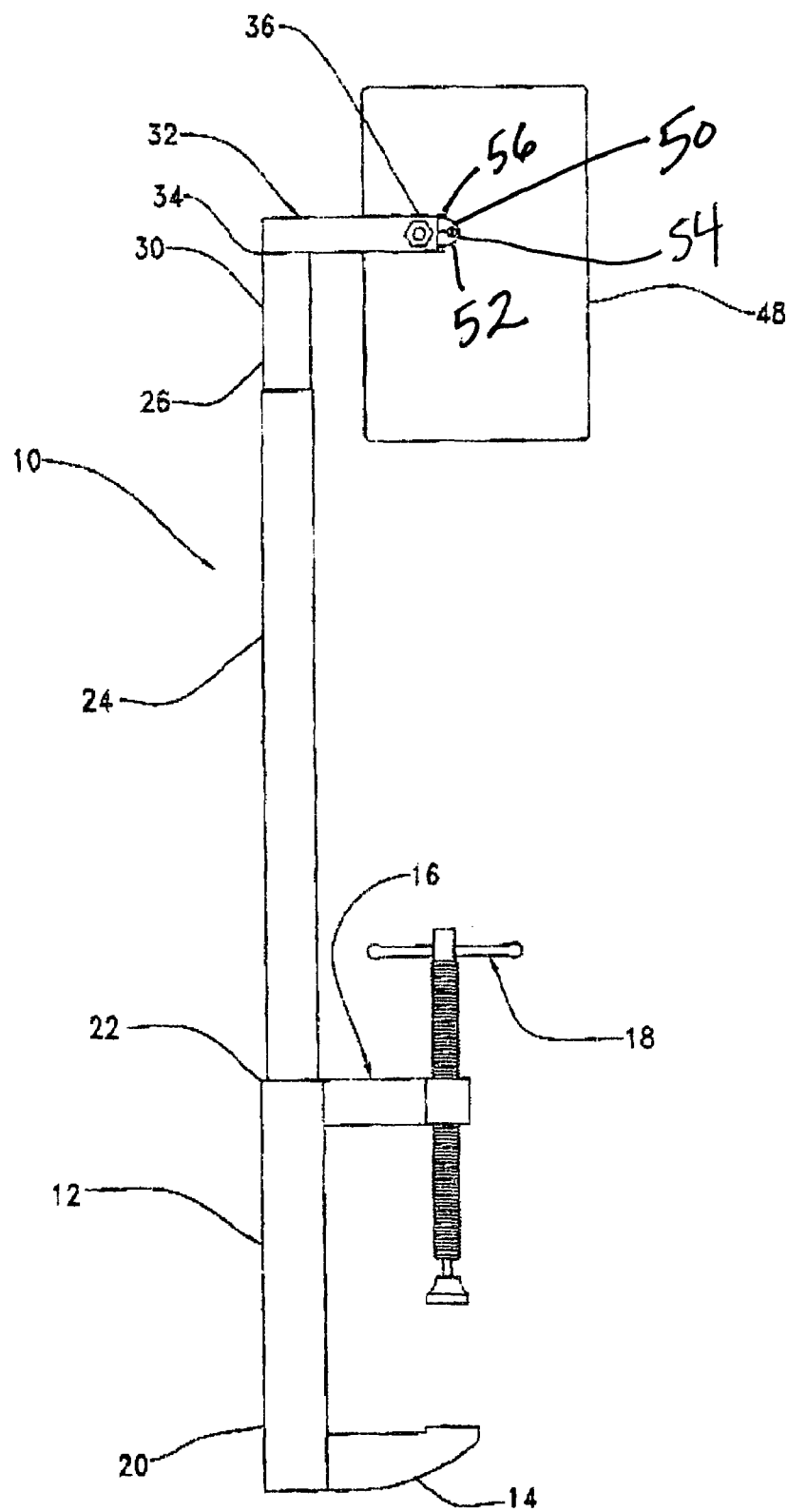
FIG. 7 is a rear view of the adjustable mirror mechanism of this invention showing the mounting for a 360° rotation thereof, as well as in plural angles to the plane of rotation.

FIG. 7 is a back view of the mirror 48 showing the opposing pair of brackets 50. Specifically, the opposing brackets, secured to the backside of the mirror, such as by welding, face each other with the respective concave sections defining a generally circular opening. Additionally, the four end wings 52 include threaded apertures for receiving fastener members 56 to bring together a respective pair of end wings to readily secure and close the circular opening about the ball 46 to thereby temporarily secure the mirror 48 in the desired position.

It is recognized that changes, variations and modifications may be made to the adjustable mirror assembly of this invention without departing from the spirit and scope thereof. Accordingly, no limitation is intended to be imposed thereon except as set forth in the accompanying claims.

I claim:

1. In combination with a towing vehicle having an operator cab, and a trailer, where the trailer is mountable to said vehicle through a coupler on said vehicle, a hitch on said trailer, and a ball mount for connecting between said coupler and said hitch,
   a pivotal remote mirror assembly for mounting between said vehicle and said trailer, said remote mirror assembly comprising:
   a.) a clamping member for positioning and securing said mirror assembly between said vehicle and said trailer to allow an operator from said cab to align said vehicle with said trailer;
   b.) a first tubular member mounted to said clamping member;
   c.) a second tubular member in telescopic relationship to said first tubular member to effect a height adjustment with said first tubular member;
   d.) means to secure said tubular members at selective vertical positions;
   e.) a free end on said second tubular member mounting a pivotal arm, said pivotal arm being mounted to a balled pin; and,
   f.) a mirror having back face mounting brackets for engaging said balled pin, wherein said back face mounting brackets comprise a pair of spaced apart members consisting of a pair of opposing members having central concave sections, said concave sections lying in opposing relationship to define a generally circular opening for receiving said balled pin, said mirror being pivotal about 360°.

2. The combination according to claim 1, wherein said balled pin is mounted perpendicular to said pivotal arm, and said balled pin includes an end having a ball for engaging said back face mounting brackets.

3. The combination according to claim 1,
   wherein said spaced apart opposing members include aperture means for opening and closing the space therebetween to facilitate gripping of said ball.

4. In combination with a towing vehicle having an operator cab, and a trailer, where the trailer is mountable to said vehicle through a coupler on said vehicle, a hitch on said trailer, and a ball mount for connecting between said coupler and said hitch,
   a pivotal remote mirror assembly for mounting between said vehicle and said trailer, said remote mirror assembly comprising:
   a.) removably attachable means for positioning and securing said mirror assembly between said vehicle and said trailer to allow an operator from said cab to align said vehicle with said trailer;
   b.) a first tubular member mounted to said attachable means;
   c.) a second tubular member in telescopic relationship to said first tubular member to effect a height adjustment with said first tubular member;
   d.) means to secure said tubular members at selective vertical positions;
   e.) a free end on said second tubular member mounting a pivotal arm which contains a balled pin; and,
   f.) a mirror having a back face mounting brackets for engaging said balled pin, wherein said back face mounting brackets comprise a pair of spaced apart members consisting of a pair of opposing members having central concave sections, said concave sections lying in opposing relationship to define a generally circular opening for receiving said balled pin, said mirror being pivotal about 360°.

5. The combination according to claim 4, wherein said balled pin is perpendicular to said pivotal arm, and said balled pin includes an end having a ball for engaging said back face mounting brackets.

6. The combination according to claim 5, including means for adjustably mounting said mirror to said balled pin.

* * * * *